(12) United States Patent
Maciuca et al.

(10) Patent No.: US 7,317,527 B1
(45) Date of Patent: Jan. 8, 2008

(54) SPATIAL LIGHT MODULATOR FOURIER TRANSFORM

(75) Inventors: Dragos Maciuca, Castro Valley, CA (US); Grace H. Chen, San Jose, CA (US); Tao-Yi Fu, Fremont, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 275 days.

(21) Appl. No.: 10/999,017

(22) Filed: Nov. 29, 2004

(51) Int. Cl.
*G01J 4/00* (2006.01)
(52) U.S. Cl. ...................................... 356/364; 349/104
(58) Field of Classification Search ................ 359/559; 345/87; 356/237.4, 237.5; 349/73, 74, 17, 349/75, 77, 81, 104
See application file for complete search history.

(56) References Cited

U.S. PATENT DOCUMENTS

| | | | | |
|---|---|---|---|---|
| 4,039,254 A * | 8/1977 | Harsch | ......................... | 349/14 |
| 5,172,257 A * | 12/1992 | Patel | .......................... | 349/198 |
| 5,276,498 A * | 1/1994 | Galbraith et al. | ........ | 356/237.2 |
| 5,868,951 A | 2/1999 | Schuck, III et al. | .......... | 216/24 |
| 6,606,140 B1 * | 8/2003 | Ito et al. | ...................... | 349/123 |
| 6,643,007 B2 * | 11/2003 | Le | ........................... | 356/237.3 |
| 6,686,994 B2 | 2/2004 | Wilk et al. | ............... | 356/237.1 |
| 6,686,995 B2 | 2/2004 | Wilk et al. | ............... | 356/237.3 |

\* cited by examiner

*Primary Examiner*—Tarifur Chowdhury
*Assistant Examiner*—Jonathon D Cook
(74) *Attorney, Agent, or Firm*—Luedeka, Neely & Graham, P.C.

(57) ABSTRACT

A filter to selectively block light from passing through the filter and to selectively permit light to pass through the filter. The filter includes an array with a plurality of individually addressable filter elements. Each filter element is selectively settable to have a variable transmittance to the light of between substantially zero percent and substantially one hundred percent. In this manner, the filter according to the present invention provides areas that pass only a portion of the light, and thus can block the light using patterns other than just an abrupt on/off filtering. By so doing, the filter is able to dramatically reduce, and in some embodiments eliminate, the light ringing that typically accompanies such on/off filters.

16 Claims, 6 Drawing Sheets

SPATIAL LIGHT MODULATOR FOURIER TRANSFORM

FIELD

This invention relates to the field of integrated circuit fabrication. More particularly, this invention relates to the imaging processes, such as inspection, that are performed during integrated circuit fabrication.

BACKGROUND

Integrated circuit fabrication makes use of many different optical processes. As the term is used herein, "integrated circuit" includes devices such as those formed on monolithic semiconducting substrates, such as those formed of group IV materials like silicon or germanium, or group III-V compounds like gallium arsenide, InP, or mixtures of such materials. The term includes all types of devices formed, such as memory and logic, and all designs of such devices, such as MOS and bipolar. The term also comprehends applications such as flat panel displays, solar cells, and charge coupled devices. Fourier filters are sometimes used in the systems that implement these optical processes, such as inspection systems, alignment systems, and exposure systems.

At least two previous methods exist for implementing a Fourier filter, which methods are a mechanical method and a liquid crystal method. The mechanical method utilizes physical rods that are placed so as to block the regular pattern bright areas present at the Fourier plane. The liquid crystal method uses a one-dimensional or two-dimensional, fully blocking or fully transmissive liquid crystal system with a digital output to block the regular pattern bright areas present at the Fourier plane.

The mechanical method has several disadvantages. First, this method induces ringing. Since the transition from full transmission to no transmission occurs instantaneously at an interface between the two extremes, the system has a step input response. The output response contains a large amount of ringing that reduces the signal to noise ratio, especially in the array region. Second, this method can only be implemented as a one-dimensional Fourier filter. Since the rods span the entire Fourier plane from one end to the other, blocking a single spot requires blocking the entire coordinate along the axis of the rod that defines the spot. Third, since the rods must have a relatively large diameter in order to be structurally sound, only a limited number of rods can be used, or else the entire Fourier plane would be blocked. Fourth, this method entails the typical issues associated with mechanical systems, such as reliability issues, large size, and low operating speed.

The liquid crystal method has many of the same problems as the mechanical method. The liquid crystal Fourier filter operates on the principle of light scatter, therefore providing areas of either full transmission or zero transmission. Because of this, ringing is present after the image is filtered. Although the two-dimensional implementation allows for the filtering of individual spots, the one-dimensional implementation presents the same issues as the mechanical method when trying to block individual spots. In addition, since this method utilizes light scatter, it cannot block light only partially, thus it can behave only as a digital output spatial light modulator. Light scatter also tends to introduce wave front phase aberrations.

What is needed, therefore, is a system whereby problems such as those described above can be overcome, at least in part.

SUMMARY

The above and other needs are met by a filter to selectively block light from passing through the filter and to selectively permit light to pass through the filter. The filter includes an array with a plurality of individually addressable filter elements. Each filter element is selectively settable to have a variable transmittance to the light of between substantially zero percent and substantially one hundred percent.

In this manner, the filter according to the present invention provides areas that pass only a portion of the light, and thus can block the light using patterns other than just an abrupt on/off filtering. By so doing, the filter is able to dramatically reduce, and in some embodiments eliminate, the light ringing that typically accompanies such on/off filters.

In various embodiments, the variable transmittance is a continuously variable transmittance. The array is preferably one of either a one dimensional array of bars or a two dimensional array of pixels. In use, preferably a first portion of the filter elements are set to be opaque, a second portion of the filter elements are set to be transparent, and a third portion of the filter elements are set to be partially translucent. Most preferably, the three portions of filter elements are disposed to selectively block the light in a sinusoidal pattern, with the first portion disposed in an interior position, the third portion disposed around outer edges of the first portion, and the second portion disposed around outer edges of the third portion. In some embodiments there are several portions, each with a different degree of opacity.

Each of the filter elements is preferably comprised of two mask levels of liquid crystal pixels, where the liquid crystal pixels are registered relative to each other such that extraordinary axes of the liquid crystal pixels are arranged at substantially ninety degrees to each other. Most preferably the extraordinary axes of the liquid crystal pixels are arranged at substantially forty-five degrees to a polarization of the light. Polarizers are preferably disposed on either side of the array, where the polarizers are oriented to a common axis of polarization. The filter is variously used in an optical inspection system, an optical alignment system, or an optical exposure system.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
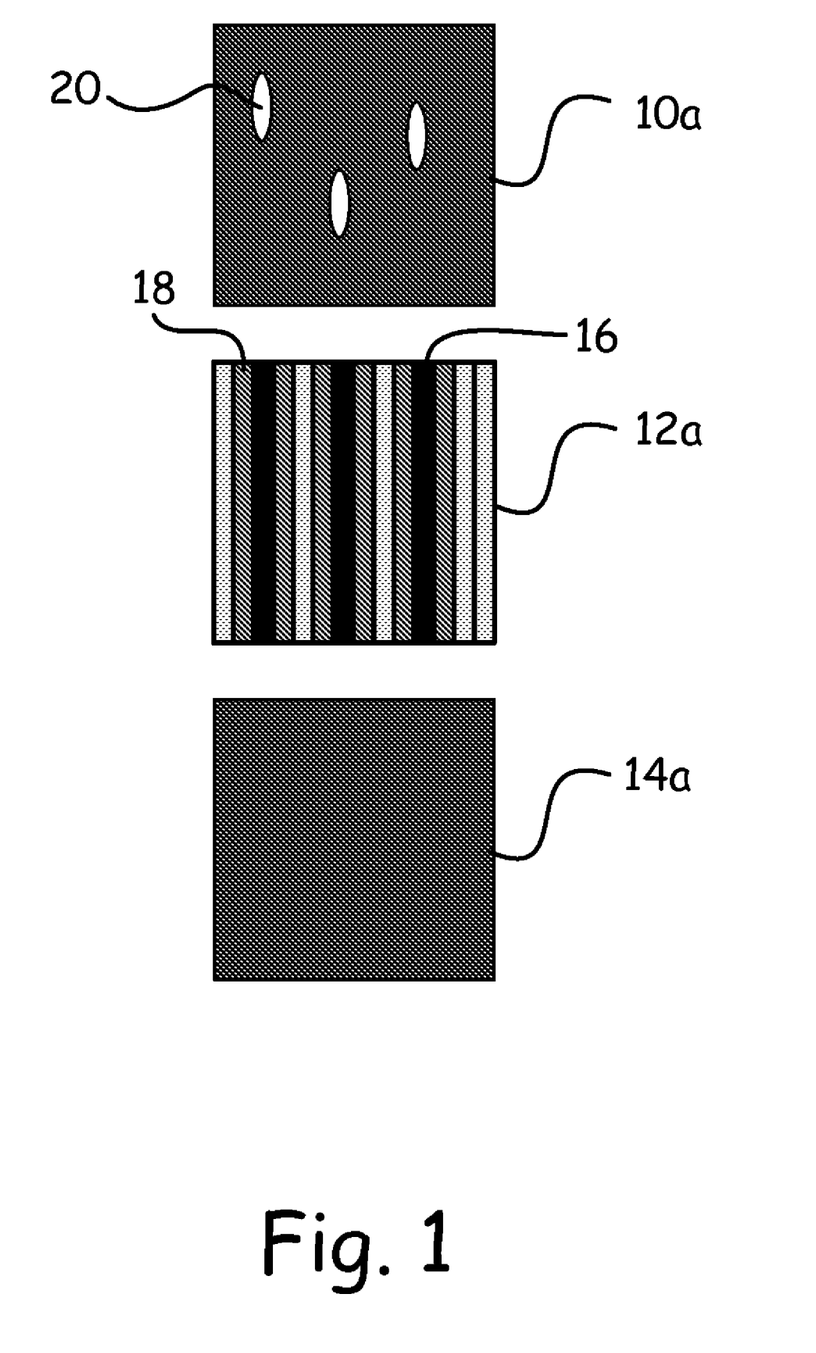
FIG. 1 is a representation of a spatial light modulator Fourier filter according to a first embodiment of the present invention, depicting also the Fourier plane and the filtered image.

The preferred embodiments of the present invention use an analog, dual-mask spatial light modulator as a Fourier filter for a dark field imaging system. Such use of the spatial light modulator preferably reduces and most preferably eliminates ringing s problems that are associated with such imaging applications when a traditional Fourier filter is used. The spatial light modulator preferably allows for smooth transitions between full transmission areas and no transmission areas. This accounts for the preferred analog output. Such a configuration differs from a digital output spatial light modulator, which is only capable of full or no transmission or reflectivity, and no gradations in between these two extremes. Additionally, the spatial light modulator preferably does not introduce any wave front phase aberrations. In other words, the optical wave front is preferably preserved and the spatial light modulator preferably prevents image quality degradation thereby The analog output, dual-mask spatial light modulator is preferably placed in the Fourier plane where it preferably acts as a sinusoidal Fourier filter. It is appreciated that only an analog output, dual-mask spatial light modulator can achieve a sinusoidal Fourier filter without introducing wave front phase aberrations. Since the spatial light modulator is capable of modulating the amplitude without inducing phase changes, a sinusoidal Fourier filter is implemented. Simulations show that a sinusoidal Fourier filter reduces ringing in the filtered image. FIG. 1 shows the implementation of this filtering method.

As depicted in FIG. 1, the Fourier plane image 10a is depicted at the top of the figure, the Fourier filter 12a is depicted in the middle of the figure, and the resultant filtered image 14a is depicted at the bottom of the figure. As depicted, the filter 12a has elements 16 that are completely opaque and thus block any light that would otherwise pass through them. In addition, elements 18 are partially transmissive and only block a selective portion of the light that would otherwise pass unheeded through them. In this manner, the light that would pass through portions 20 in the Fourier plane is effectively filtered without the ringing effect that would tend to occur when the partially transmissive elements 18 are not disposed adjacent both sides of the opaque elements 16.

Figure 2:
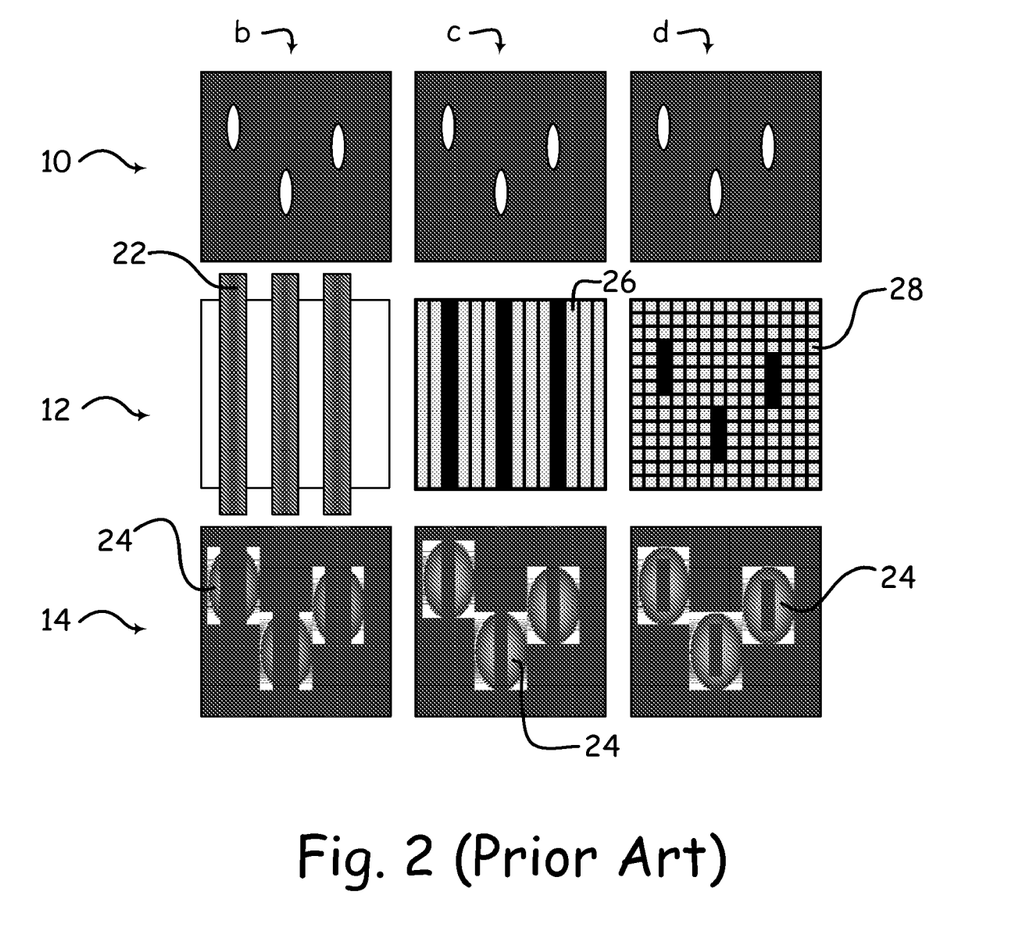
FIG. 2 is a representation of various prior art Fourier filters, depicting also the Fourier planes and the filtered images.

FIG. 2 provides three representation of prior art designs, which provide a depiction of the ringing problems inherent with the prior art designs. As before, the Fourier plane image is given as 10 in the top row of the figure, the Fourier filter is given as 12 in the middle row of the figure, and the filtered image is given as 14 at the bottom of the figure. Columns b, c, and d represent different embodiments of the combined plane 10, filter 12, and image 14.

Filter 12b is standard mechanical filter having physical rods 22 that can be moved about as necessary within the boundary of the filter 12b. However, such rods 22 produce the ringing effect 24 as depicted in 14b. Filter 12c uses addressable lines 26 which can be selectively darkened, such as may be implemented with a liquid crystal screen. However, the same ringing problems 24 are evident in the image 14c. Filter 12d uses a two dimensional array of addressable elements 28 which can be selectively darkened, again such as with a liquid crystal screen. However, because the elements 28 are either completing blocking or completely transmissive, a similar ringing problem 24 is evident in image 14d.

One of the most important characteristics of the spatial light modulator used in this application is its ability to control amplitude without introducing phase aberrations. Put differently, the spatial light modulator is preferably able to control phase and amplitude independent of each other. Such a device is described in U.S. Pat. No. 5,868,951, the entire disclosure of which is incorporated by reference herein in its entirety.

Figure 3:
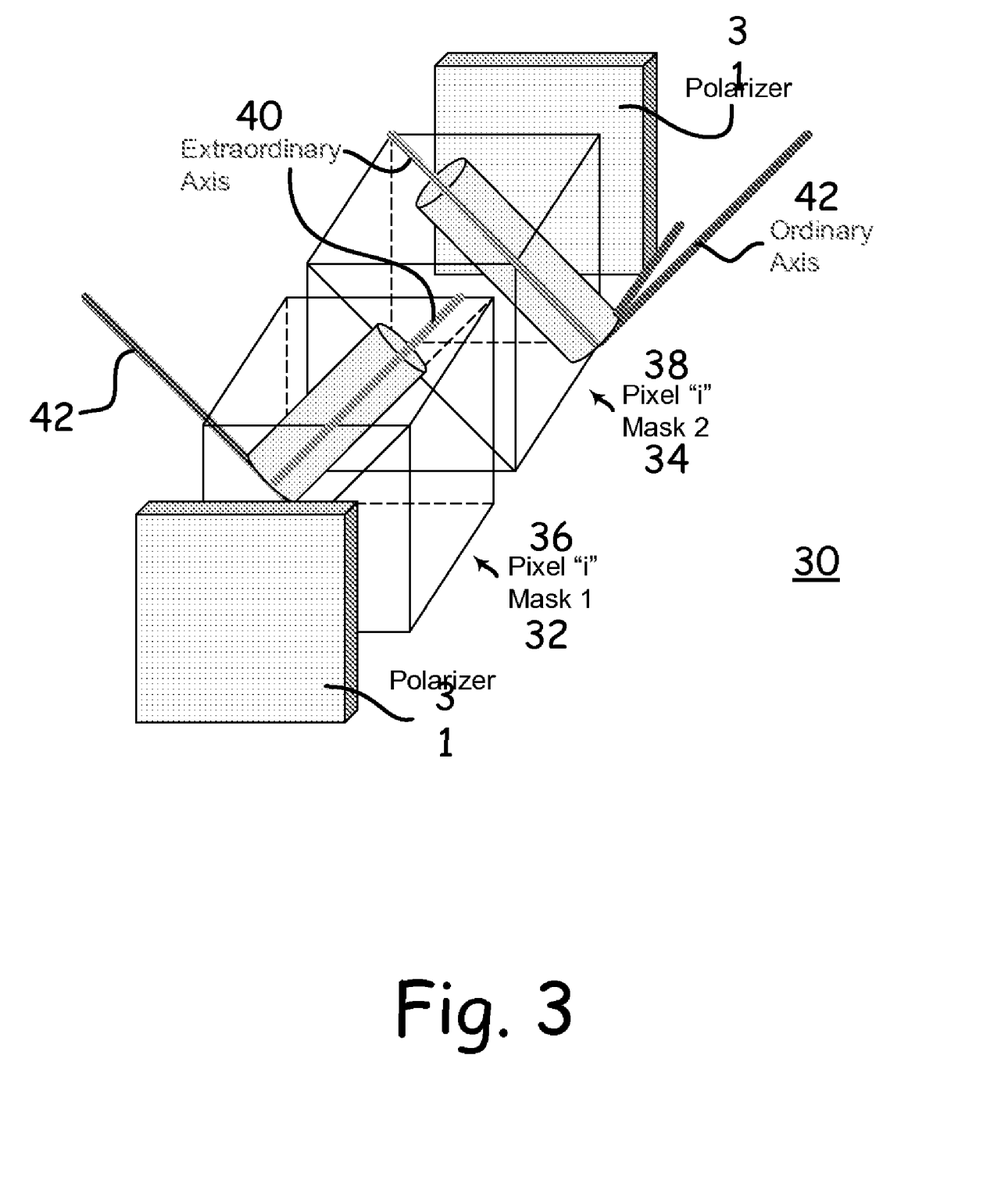
FIG. 3 is a representation of a portion of a spatial light modulator Fourier filter according to a preferred embodiment of the present invention.

The spatial light modulator 30 as depicted in FIG. 3 preferably consists of two masks 32 and 34 that are each made up of a multitude of liquid crystal pixels. The two masks 32 and 34 are preferably registered relative to each other such that pixel "i" 36 in the first mask 32 matches pixel "i" 38 in the second mask 34. Furthermore, the extraordinary axes 40 of the liquid crystals in the two masks 32 and 34 are preferably arranged at substantially ninety degrees to each other and at substantially forty-five degrees to the polarization of the incoming light. The polarization of the light is preferably accomplished by one, and most preferably two, polarizers 31.

When compared with the mechanical implementation 12b of the Fourier filter, the spatial light modulator implementation 12a and 30 offers smaller size, higher resolution, greater flexibility in choosing the pitch, higher reliability and faster response time. When compared with both the mechanical and the old liquid crystal implementation, the spatial light modulator Fourier filter 30 and 12a has the ability to filter the light using a sinusoidal amplitude filter without introducing wave front phase aberrations. This results in reduced ringing, and preferably eliminated ringing, and thus a higher signal to noise ratio in the filtered image 14a.

Figure 4:
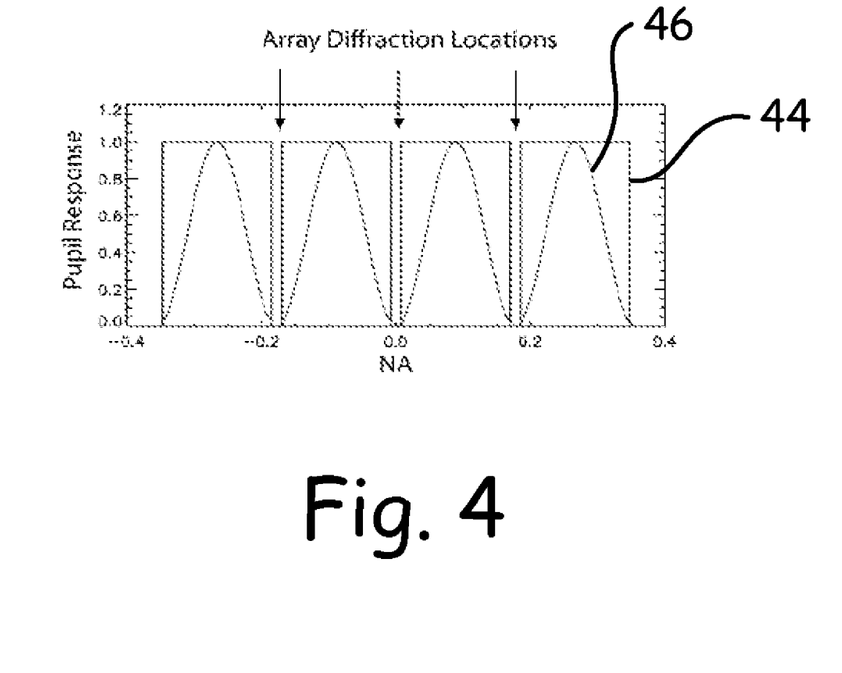
FIG. 4 is a comparison between the square edged filtering of a prior art Fourier filter and a sinusoidal spatial light modulator Fourier filter according to a preferred embodiment of the present invention.
Figure 5:
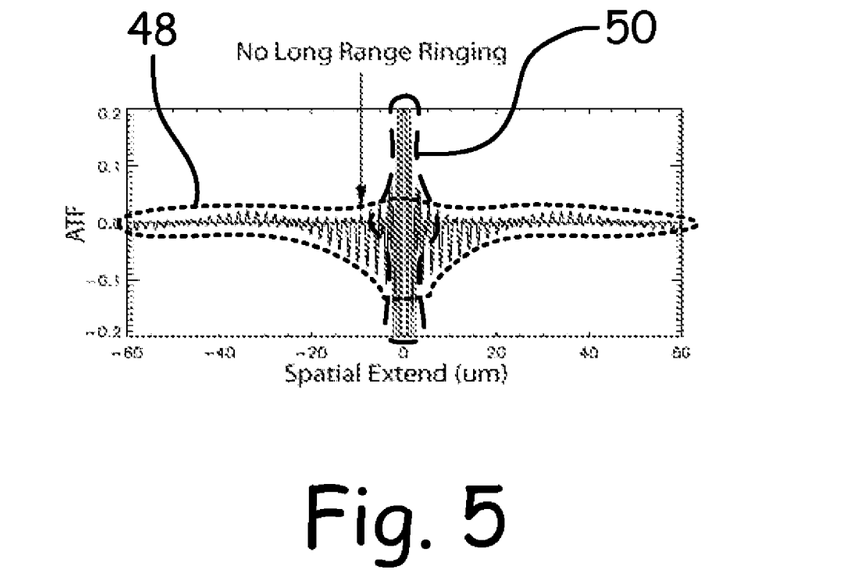
FIG. 5 is a comparison between the long range ringing of a prior art Fourier filter and the tighter attenuation of a spatial light modulator Fourier filter according to a preferred embodiment of the present invention.

FIGS. 4 and 5 illustrate this concept. In FIG. 4, the square tooth filters 44 represent the prior art methods, whereas the sinusoidal elements 46 represent the new methods. In FIG. 5 there is depicted the tightly attenuated image as outlined in area 50, as compared to the ringing pattern as outlined in area 48.

Figure 6:
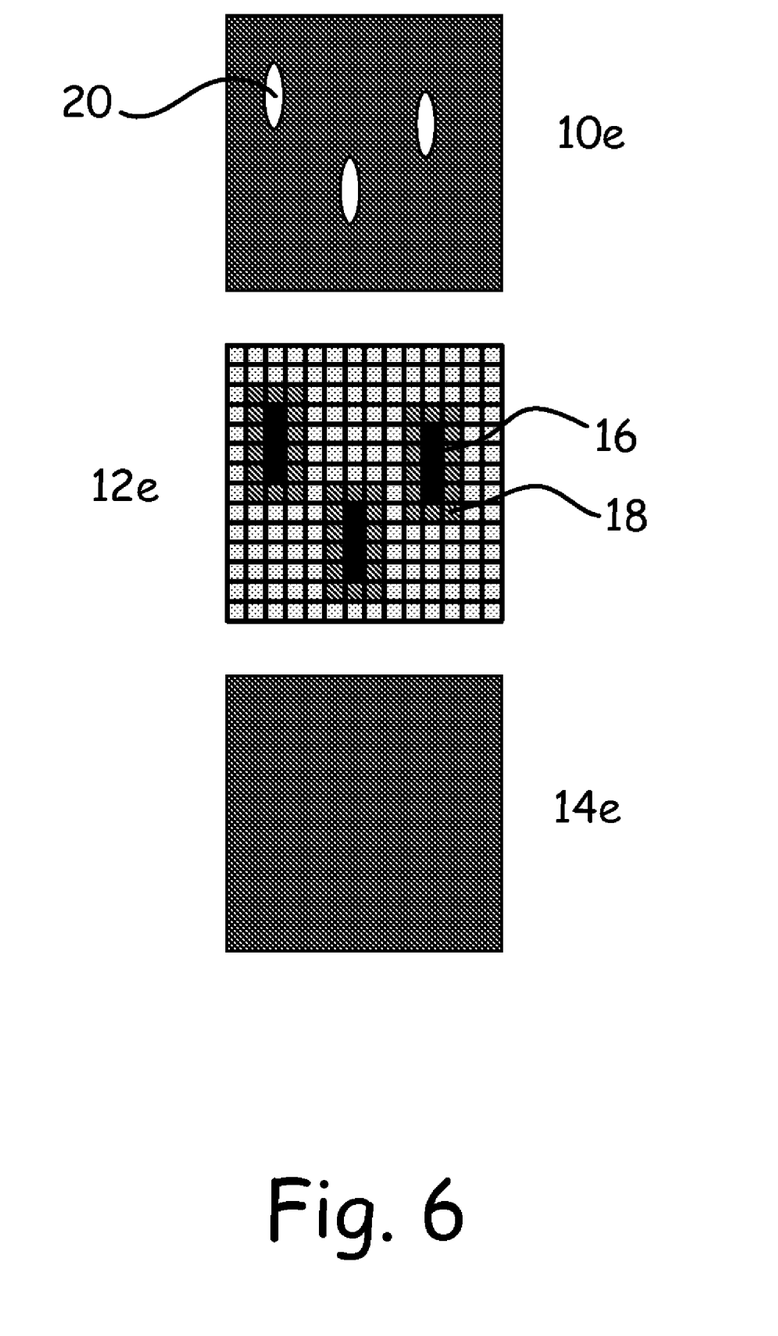
FIG. 6 is a representation of a spatial light modulator Fourier filter according to a second embodiment of the present invention, depicting also the Fourier plane and the filtered image.

The one-dimensional spatial light modulator 12a as depicted in FIG. 1 can also be implemented in a two-dimensional filter 12e, as depicted in FIG. 6. The mask 12e of FIG. 6 also depicts very clearly the preferred used of the mask 12e, where some of the elements 16 are set to be opaque and block the light. These elements 16 are preferably surrounded with elements 18 that partially block the light. The other elements are preferably set to pass whatever light may reach them. In this manner, the sinusoidal filtering effect as depicted in FIG. 4 is enabled, and the reduced ringing as depicted in FIG. 5 is accomplished.

Figure 7:
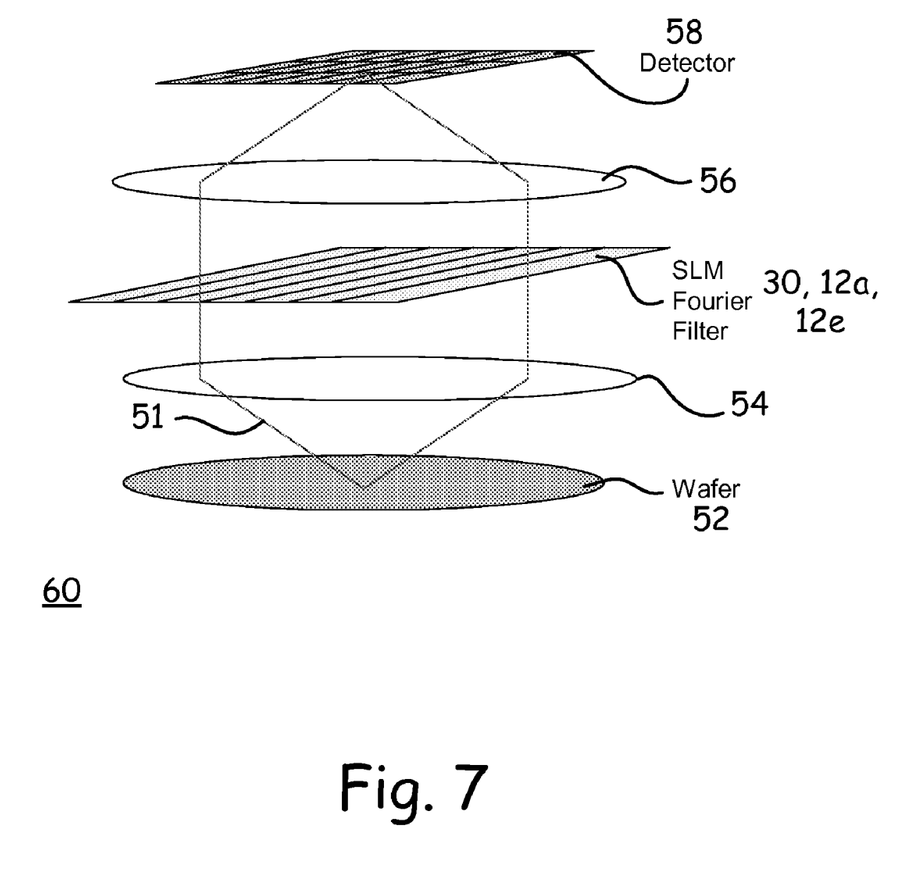
FIG. 7 is a functional block diagram of a spatial light modulator Fourier filter according to a preferred embodiment of the present invention, as included within an inspection system.

FIG. 7 depicts a possible implementation of the filters described above in a system 60, where the system 60 may be an optical inspection system, an optical alignment system, or an optical exposure system, where the light 51 coming from the substrate 52 passes through a first lens 54, then through the spatial light modulator Fourier filter 12a or 12e as described above, and then through a second lens 56 which focuses the filtered light onto a detector 58.

Thus, the various embodiments of the present invention have several novel features, including the use of a sinusoidal Fourier filter, the use of a spatial light modulator as a Fourier filter, and the use of a dual mask (phase/amplitude) spatial light modulator for wafer inspection. Therefore, the embodiments of the present invention provide a practical way to implement a sinusoidal Fourier filter. It is more reliable than a mechanical Fourier filter, and in addition it reduces the ringing that is present in the filtered image when using the old methods of filtering.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A filter adapted to selectively block light from passing through the filter and to selectively permit light to pass through the filter, the filter comprising an array having a plurality of individually addressable filter elements, where each filter element is selectively settable to have a variable transmittance to the light of between substantially zero percent and substantially one hundred percent, wherein each filter element is comprised of two mask levels of liquid crystal pixels, where the liquid crystal pixels are registered relative to each other such that extraordinary axes of the liquid crystal pixels are arranged at substantially ninety degrees to each other and at substantially forty-five degrees to a polarization of the light.

2. The filter of claim 1, wherein the variable transmittance is a continuously variable transmittance.

3. The filter of claim 1, wherein the array is a two dimensional array of pixels.

4. The filter of claim 1, wherein a first portion of the filter elements are set to be opaque, a second portion of the filter elements are set to be transparent, and a third portion of the filter elements are set to be partially translucent.

5. The filter of claim 1, wherein a first portion of the filter elements are set to be opaque, a second portion of the filter elements are set to be transparent, and a third portion of the filter elements are set to be partially translucent, and the three portions of filter elements are disposed to selectively block the light in a sinusoidal pattern, with the first portion disposed in an interior position, the third portion disposed around outer edges of the first portion, and the second portion disposed around outer edges of the third portion.

6. The filter of claim 5, wherein the third portion comprises a plurality of portions, each of the plurality of portions set to varying levels of translucency.

7. The filter of claim 1, further comprising polarizers disposed on either side of the array, where the polarizers are oriented to a common axis of polarization.

8. An optical inspection system, the improvement comprising the filter of claim 1.

9. An optical alignment system, the improvement comprising the filter of claim 1.

10. An optical exposure system, the improvement comprising the filter of claim 1.

11. A Fourier filter adapted to selectively block light from passing through the filter and to selectively permit light to pass through the filter, the filter comprising an array having a plurality of individually addressable filter elements, where each filter element is selectively settable to have a continuously variable transmittance to the light of between substantially zero percent and substantially one hundred percent, and each of the filter elements is comprised of two mask levels of liquid crystal pixels, where the liquid crystal pixels are registered relative to each other such that extraordinary axes of the liquid crystal pixels are arranged at substantially ninety degrees to each other, with polarizers disposed on either side of the array, where the polarizers are oriented to a common axis of polarization, wherein a first portion of the filter elements are set to be opaque, a second portion of the filter elements are set to be transparent, and a third portion of the filter elements are set to be partially translucent, and the three portions of filter elements are disposed to selectively block the light in a sinusoidal pattern, with the first portion disposed in an interior position, the third portion disposed around outer edges of the first portion, and the second portion disposed around outer edges of the third portion.

12. The filter of claim 11, wherein the third portion comprises a plurality of portions, each of the plurality of portions set to varying levels of translucency.

13. A Fourier filter adapted to selectively block light from passing through the filter and to selectively permit light to pass through the filter, the filter comprising an array having a plurality of individually addressable filter elements, where each filter element is selectively settable to have a continuously variable transmittance to the light of between substantially zero percent and substantially one hundred percent, and each of the filter elements is comprised of two mask levels of liquid crystal pixels, where the liquid crystal pixels are registered relative to each other such that extraordinary axes of the liquid crystal pixels are arranged at substantially ninety degrees to each other, with polarizers disposed on either side of the array, where the polarizers are oriented to a common axis of polarization, wherein extraordinary axes of the liquid crystal pixels are arranged at substantially forty-five degrees to the axis of polarization of the light.

14. A Fourier filter adapted to selectively block light from passing through the filter and to selectively permit light to pass through the filter, the filter comprising:

an array having a plurality of individually addressable filter elements, where each filter element is selectively settable to have a continuously variable transmittance to the light of between substantially zero percent and substantially one hundred percent, each of the filter elements having two mask levels of liquid crystal pixels, where the liquid crystal pixels are registered relative to each other such that extraordinary axes of the liquid crystal pixels are arranged at substantially ninety degrees to each other, and polarizers disposed on either side of the array, where the polarizers are oriented to a common axis of polarization, and the extraordinary axes of the liquid crystal pixels are arranged at substantially forty-five degrees to the axis of polarization of the light, wherein during use a first portion of the filter elements are set to be opaque, a second portion of the filter elements are set to be transparent, and a third portion of the filter elements are set to be partially translucent, and the three portions of filter elements are disposed to selectively block the light in a sinusoidal pattern, with the first portion disposed in an interior position, the third portion disposed around outer edges of the first portion, and the second portion disposed around outer edges of the third portion.

15. The Fourier filter of claim 14, wherein the third portion comprises a plurality of portions, each of the plurality of portions set to varying levels of translucency.

16. The filter of claim 14, wherein the array is a two dimensional array of pixels.

* * * * *